(12) United States Patent
Akiyama

(10) Patent No.: US 11,860,355 B2
(45) Date of Patent: Jan. 2, 2024

(54) MICROSCOPIC DEVICE

(71) Applicant: YAMACHU CO., LTD, Chiba (JP)

(72) Inventor: Noriko Akiyama, Osaka (JP)

(73) Assignee: YAMACHU CO., LTD., Chiba (JP)

(*) Notice: Subject to any disclaimer, the term of this patent is extended or adjusted under 35 U.S.C. 154(b) by 303 days.

(21) Appl. No.: 17/428,028

(22) PCT Filed: Feb. 12, 2019

(86) PCT No.: PCT/JP2019/004836
§ 371 (c)(1),
(2) Date: Aug. 3, 2021

(87) PCT Pub. No.: WO2020/165941
PCT Pub. Date: Aug. 20, 2020

(65) Prior Publication Data
US 2022/0011562 A1  Jan. 13, 2022

(51) Int. Cl.
G02B 21/36 (2006.01)
G02B 21/02 (2006.01)
G02B 21/06 (2006.01)
G02B 21/26 (2006.01)
G02B 21/34 (2006.01)

(52) U.S. Cl.
CPC ......... *G02B 21/362* (2013.01); *G02B 21/025* (2013.01); *G02B 21/06* (2013.01); *G02B 21/26* (2013.01); *G02B 21/34* (2013.01)

(58) Field of Classification Search
CPC .... G02B 21/362; G02B 21/025; G02B 21/06; G02B 21/26; G02B 21/34; G02B 21/24
See application file for complete search history.

(56) References Cited

U.S. PATENT DOCUMENTS 9,154,594 B2 * 10/2015 Fletcher ................ G02B 21/26
9,900,558 B2     2/2018 Lin et al.
(Continued)

FOREIGN PATENT DOCUMENTS

JP   2013158335 A   8/2013
JP   2016505890 A   2/2016
(Continued)

OTHER PUBLICATIONS

International Search Report and Written Opinion issued in PCT/JP2019/004836, dated May 21, 2019, 10 pages. with partial translation.
(Continued)

*Primary Examiner* — Michael E Teitelbaum
(74) *Attorney, Agent, or Firm* — RatnerPrestia

(57) ABSTRACT

It was not always easy to observe the collected specimens at the specimen collection site. With a specimen container part having an observation cell which stores a collected specimen and allows observation of cells contained in the collected specimen, a phase-contrast objective lens disposed at a position corresponding to the observation cell, and a smartphone mounting fixture on which a smartphone with an imaging function can be mounted, a multifunctional phase-contrast microscopic device MR performing the observation of cells via a phase-contrast objective lens by using a smartphone mounted on a smartphone mounting fixture is provided.

5 Claims, 6 Drawing Sheets

(56) References Cited

U.S. PATENT DOCUMENTS

| | | | |
|---|---|---|---|
| 2014/0154152 A1 | 6/2014 | Chumanov et al. | |
| 2015/0177147 A1 | 6/2015 | Mangan et al. | |
| 2016/0041152 A1 | 2/2016 | Zimmerle et al. | |
| 2016/0070092 A1 | 3/2016 | Ozcan et al. | |
| 2017/0160534 A1 | 6/2017 | Fan | |
| 2017/0370709 A1* | 12/2017 | Mace | G02B 21/32 |

FOREIGN PATENT DOCUMENTS

| | | |
|---|---|---|
| JP | 201667322 A | 5/2016 |
| JP | 201685456 A | 5/2016 |
| WO | 2014099823 A2 | 6/2014 |
| WO | 2018087665 A1 | 5/2018 |

OTHER PUBLICATIONS

Extended European Search Report for European Application No. 19 914 934.5, dated Jul. 29, 2022, 7 pages.

* cited by examiner

FIG. 4(a)
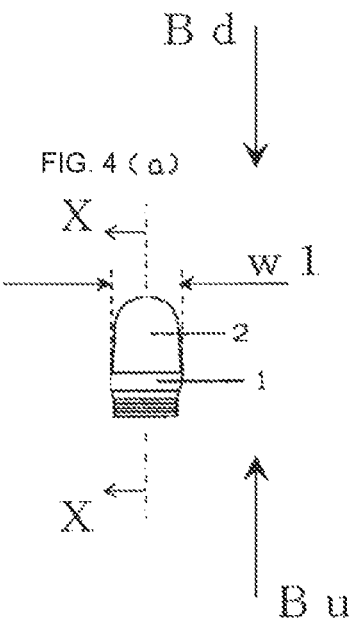
FIG. 4(b)
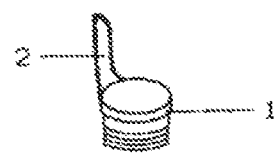
FIG. 4(c)
FIG. 4(d)
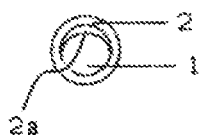
FIG. 4(e)
FIG. 4(f)
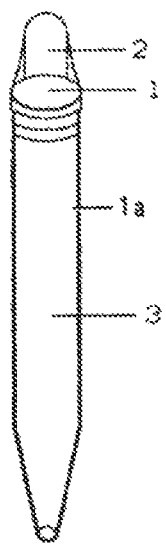
FIG. 4(g)
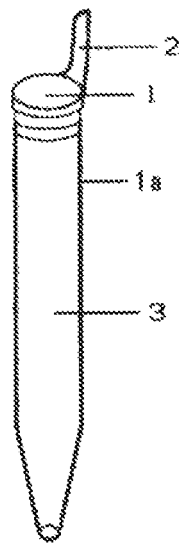

MICROSCOPIC DEVICE

CROSS REFERENCE TO RELATED APPLICATIONS

This application is a U.S. National Phase Application of PCT International Application No. PCT/JP2019/004836, filed Feb. 12, 2019. The contents of this application are incorporated herein by reference.

TECHNICAL FIELD

The present invention relates to, for example, a microscopic device for performing an evaluation of a specimen, in order to determine its adequacy.

BACKGROUND ART

Collecting cells from the human body is routinely performed in clinical practice for the purpose of cytological examinations and the like (see, for example, patent documents 1 and 2). Cell collection is typically performed by needle aspiration or tissue excision, which is usually carried out using a syringe, etc., and the specimen is either smeared and fixed directly on the slide glass, or it is collected in a preservative solution in a container and then slide glass is used. A slide specimen is then prepared by smearing and fixing on a glass.

Specimens, in the form of plastic test tubes or containers, or in slide glass with cells smeared, are transported to a laboratory in a medical laboratory, or a sanitary laboratory outsourced to clinical tests, for the purpose of cytological examination and the like.

The doctor in charge of cell collection will be informed at a later date, whether the targeted cells were successfully collected or not, based on a result of a cytological evaluation of the specimen. If the specimen is deemed to be inappropriate, a specimen recollection will have to be performed. Therefore, the start of treatment may be delayed, due to the burden on the subject and time loss.

To solve these sampling errors, various medical facilities have reported the need for, and made efforts to obtain, ROSE (Rapid On-site Evaluation) resources, which enable a real-time evaluation of the specimen, at the time of collection, to determine its adequacy. At most such medical facilities, a method has been adopted, in which a cytotechnologist or a laboratory technologist, brings a biological microscope to the specimen collection site in order to evaluate its adequacy.

DOCUMENT OF PRIOR ART

Patent Document

Patent document 1: JP No. 2013-158335 A, patent document 2: JP 2016-67322 A, which are incorporated herein by reference.

SUMMARY OF INVENTION

Technical Problem

However, at most facilities, the problem of having a technologist goes to the specimen collection site is often not solved, and ROSE is performed in a relatively small number of facilities. In most cases, doctors in small medical facilities where technologists are absent, or in institutions that do not understand ROSE, request cytological examinations with a condition not knowing whether cells had been collected properly or not. Such problems have long been raised as issues, but a fundamental solution has not yet been reached.

Therefore, as previously described, the observation of the collected specimens at the specimen collection site have not always been easy.

The aim of the present invention is to provide a microscopic device capable of the easy observation of a collected specimen, in consideration of the above-mentioned conventional problems.

Solution to Problem

The first aspect of the present invention is a microscopic device comprising: a specimen container part storing a collected specimen and having an observation area in which cells contained in the collected specimen can be observed; an objective lens aligned at a position corresponding to-the observation area; and a portable device mounting section on which a portable device having an imaging function can be mounted, wherein the observation of the cells by the objective lens is performed by using the portable device mounted on the portable device mounting section.

The second aspect of the present invention is the microscopic device according to the first aspect of the present invention, wherein the specimen container part has a specimen container body for storing the collected specimen, and a specimen container lid provided with the observation area, detachable from the specimen container body.

The third aspect of the present invention is the microscopic device according to the second aspect of the present invention, comprising a specimen container part mounting section on which the specimen container part is inverted and mounted, wherein the specimen container part is detachable from the specimen container part mounting section, wherein the specimen container part is inverted and mounted on the specimen container part mounting section so that cells contained in specimen stored in the specimen container body are guided to the observation area.

The fourth aspect of the present invention is the microscopic device as according to the second or third aspect of the present invention, comprising a funnel having an identification area for sorting a tissue contained in the collected specimen from the cells, wherein after the tissue is sorted by using the identification area, the residue of the specimen can be dropped into the specimen container body.

The fifth aspect of the present invention is the microscopic device according to the fourth aspect of the present invention, wherein the funnel has a pool for storing a liquid for flushing the residue into the specimen container body.

The first aspect related to the present invention is a specimen container lid characterized in that an observation area is provided in which the cells contained in the collected specimen can be observed and it is detachable from the specimen container body storing a collected specimen.

The second aspect related to the present invention is a specimen container lid of the first invention related to the present invention characterized in that by a specimen container part equipped with the specimen container body is being inverted cells contained in the specimen stored in the specimen container body are guided to the observation area.

The third aspect related to the present invention is a funnel characterized in that equipped an identification area for sorting tissue contained in collected specimen from cells contained in collected specimen after tissue has been sorted by using the identification area specimen residue can be dropped into the specimen container body storing the collected specimen.

The fourth aspect related to the present invention is a funnel of the claim 3 of the invention related to the present invention characterized in that it is equipped with a pool for storing liquids to rinse off residue into the specimen container body.

Advantageous Effects of Invention

According to the present invention, it is possible to provide a microscopic device that enables the easy observation of a collected specimen.

BRIEF DESCRIPTION OF DRAWINGS

FIG. 4(a) is a schematic front view of a specimen container lid of the multifunctional phase-contrast microscopic device of an embodiment in the present invention, FIG. 4(b) is a schematic perspective view of a specimen container lid of the multifunctional phase-contrast microscopic device of an embodiment in the present invention (Part 1), FIG. 4(c) is a schematic perspective view of a specimen container lid of the multifunctional phase-contrast microscopic device of an embodiment in the present invention (Part 2), FIG. 4(d) is a schematic plan view of a specimen container lid of the multifunctional phase-contrast microscopic device of an embodiment in the present invention, FIG. 4(e) is a schematic bottom view of a specimen container lid of the multifunctional phase-contrast microscopic device of an embodiment in the present invention, FIG. 4(f) is a schematic perspective view of a specimen container part of the multifunctional phase-contrast microscopic device of an embodiment in the present invention (Part 1), and FIG. 4(g) is a schematic perspective view of a specimen container part of the multifunctional phase-contrast microscopic device of an embodiment in the present invention (Part 2).

DESCRIPTION OF EMBODIMENTS

Referring to FIGS. 1 to 5, embodiments in the present invention are described in detail below.

Figure 1:
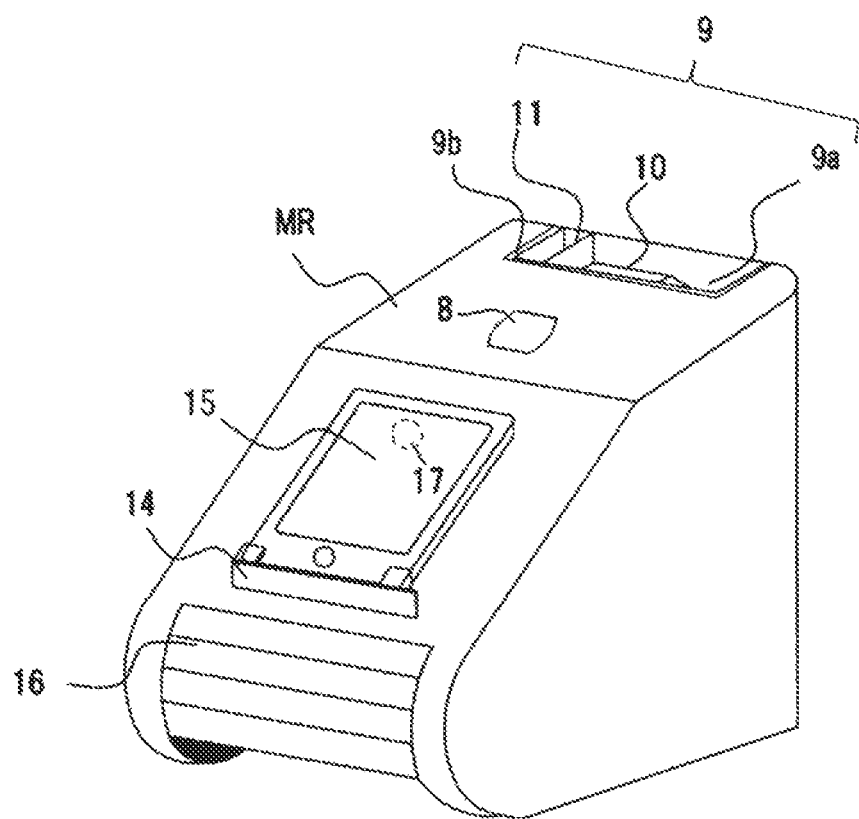
FIG. 1 is a schematic perspective view of the multifunctional phase-contrast microscopic device of an embodiment in the present invention.
Figure 2:
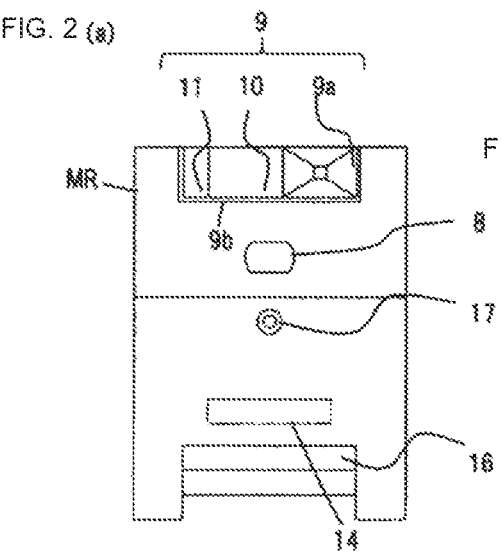
FIG. 2(a) is a schematic plan view of the multifunctional phase-contrast microscopic device of an embodiment in the present invention.
FIG. 2(b) is a schematic front view of the multifunctional phase-contrast microscopic device of an embodiment in the present invention.
FIG. 2(c) is a schematic back view of the multifunctional phase-contrast microscopic device of an embodiment in the present invention.
FIG. 2(d) is a schematic right side view of the multifunctional phase-contrast microscopic device of an embodiment in the present invention.
Figure 2:
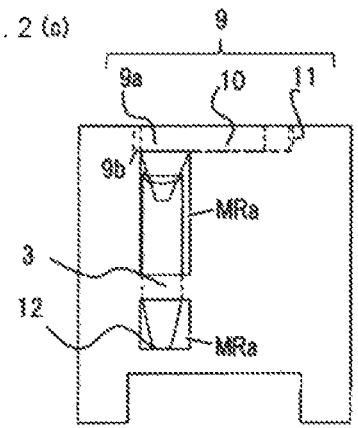
Figure 2:
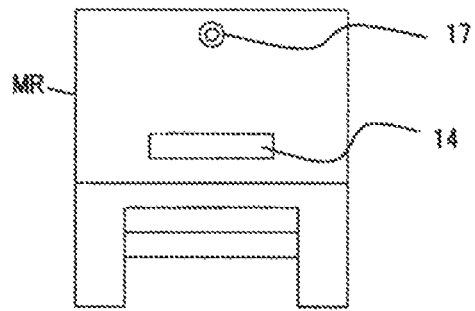
Figure 2:
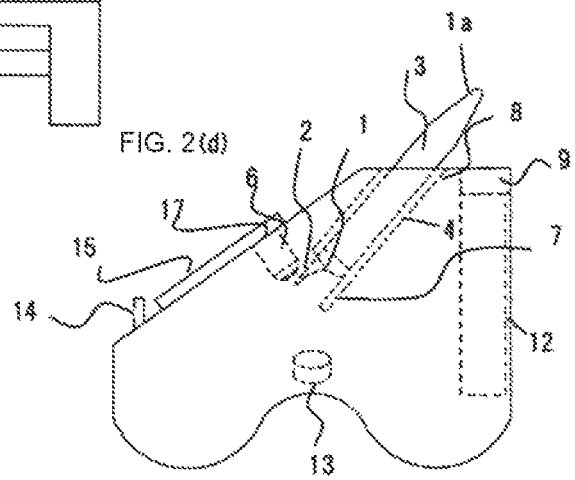

FIG. 1 is a schematic perspective view of the multifunctional phase-contrast microscopic device MR of an embodiment in the present invention.

FIG. 2(a) is a plan view of the multifunctional phase-contrast microscopic device MR of an embodiment in microscopic device the present invention, FIG. 2(b) is a front view of the multifunctional phase-contrast microscopic device MR of an embodiment in the present invention, FIG. 2(c) is a back view of the multifunctional phase-contrast microscopic device MR of an embodiment in the present invention, FIG. 2(d) is a right side view of the multifunctional phase-contrast microscopic device MR of an embodiment in the present invention.

In FIG. 2(c), the specimen container body 3, to which the specimen container lid 1 is not attached, is mounted on the stand 12. In FIG. 2(d), the specimen container body 3 to which the specimen container lid 1 is attached is inverted and mounted on the holder 4.

Figure 3A:
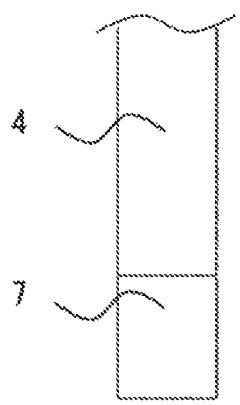
FIG. 3(a) is a schematic partial perspective view near the holder of the multifunctional phase-contrast microscopic device of an embodiment in the present invention (Part 1)
Figure 3B:
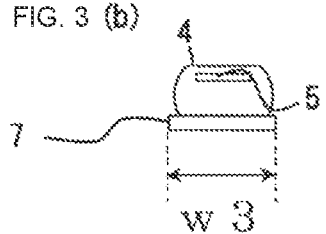
FIG. 3(b) is a schematic partial perspective view near the holder of the multifunctional phase-contrast microscopic device of an embodiment in the present invention (Part 2)
Figure 3C:
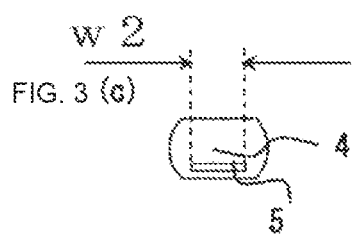
FIG. 3(c) is a schematic partial perspective view near the holder of the multifunctional phase-contrast microscopic device of an embodiment in the present invention (Part 3)
Figure 3D:
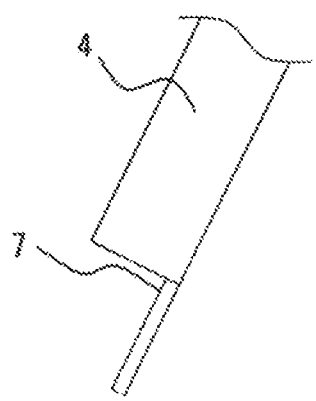
FIG. 3(d) is a schematic partial right side view near the holder of the multifunctional phase-contrast microscopic device of an embodiment in the present invention (Part 1)
Figure 3E:
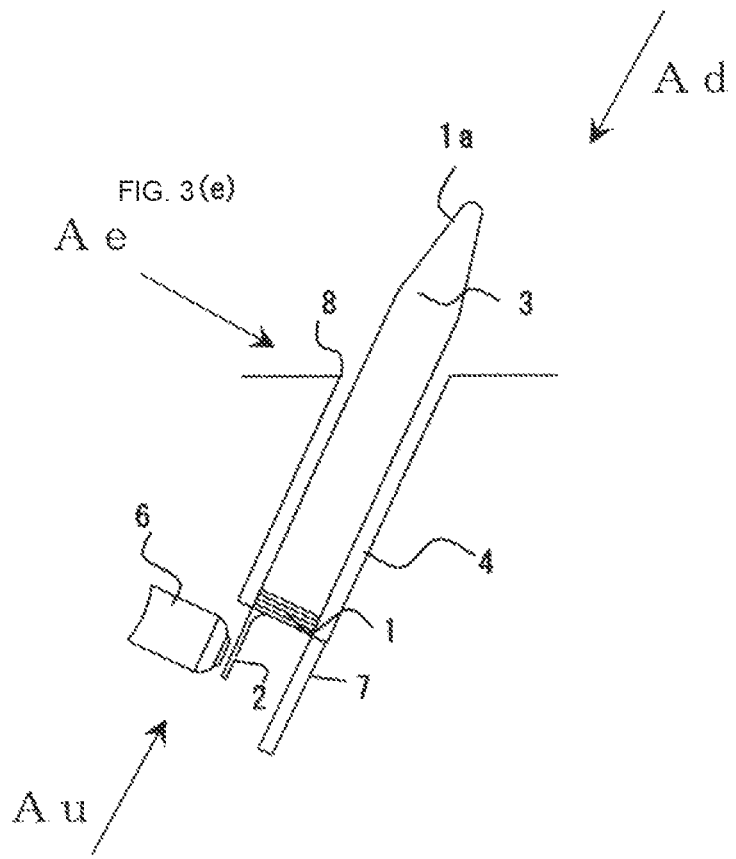
FIG. 3(e) is a schematic partial right side view near the holder of the multifunctional phase-contrast microscopic device of an embodiment in the present invention (Part 2).

FIGS. 3(a) to 3(c) are schematic partial perspective views (Part 1 to 3) near the holder of the multifunctional phase-contrast microscopic device MR of an embodiment in the present invention, FIGS. 3(d) and 3(e) show schematic partial right-side views (Part 1 to 2) near the holder of the multifunctional phase-contrast microscopic device MR of an embodiment in the present invention In FIG. 3(e), the specimen container body 3 is mounted on the holder 4 and an observation cell 2 with a flat shape, rather than a curved shape, is shown. The holder 4 is looked down diagonally from the front side of the multifunctional phase-contrast microscopic device MR in FIG. 3(a) in the direction of arrow Ae (see FIG. 3(e)), and in FIG. 3(b), it is looked up diagonally from the back of the multifunctional phase-contrast microscopic device MR in the direction of the arrow Au (see FIG. 3(e)) and in FIG. 3(c), it is viewed diagonally downward from the front of the multifunctional phase-contrast microscopic device MR in the direction of the arrow Ad (see FIG. 3(e)). In FIGS. 3(a), 3(d) and 3(e), the internal structure of the holder 4 is shown in a perspective view.

FIG. 4(a) is a schematic front view of the specimen container lid 1 of the multifunctional phase-contrast microscopic device MR of an embodiment in the present invention. FIGS. 4(b) and 4(c) are schematic perspective views of the specimen container lid 1 of the multifunctional phase-contrast microscopic device MR of an embodiment in the present invention (Part 1 and 2). FIG. 4(d) is a schematic plan view of the specimen container lid 1 of the multifunctional phase-contrast microscopic device MR of an embodiment in the present invention. FIG. 4(e) is a schematic bottom view of the specimen container lid 1 of the multifunctional phase-contrast microscopic device MR of an embodiment in the present invention. FIGS. 4(f) and 4(g) are schematic perspective views of the specimen container part 1a of the multifunctional phase-contrast microscopic device MR of an embodiment in the present invention (Part 1 and 2).

In FIGS. 4(a) to 4(g), an observation cell 2 with a curved shape, rather than a flat shape, is shown. The specimen container lid 1 is looked down in FIG. 4(d) in the direction of arrow Bd (see FIG. 4(a)) and in FIG. 4(e), it is looked up in the direction of the arrow Bu (see FIG. 4(a)).

Figure 5A:
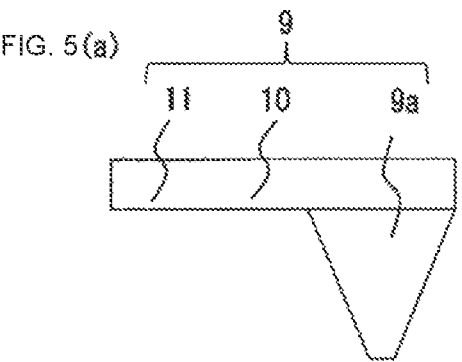
FIG. 5(a) is a schematic back view of a funnel of the multifunctional phase-contrast microscopic device of an embodiment in the present invention.
Figure 5B:
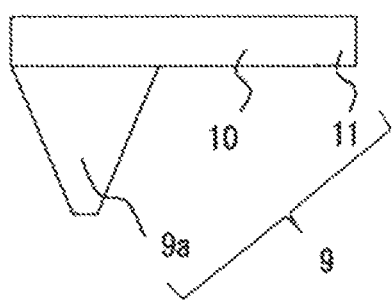
FIG. 5(b) is a schematic front view of a funnel of the multifunctional phase-contrast microscopic device of an embodiment in the present invention.
Figure 5C:
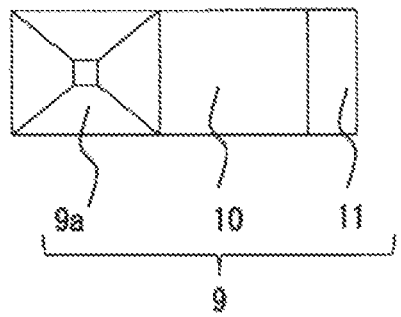
FIG. 5(c) is a schematic plan view of a funnel of the multifunctional phase-contrast microscopic device of an embodiment in the present invention.
Figure 5D:
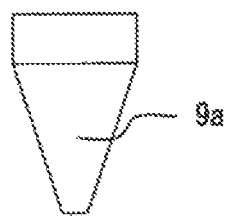
FIG. 5(d) is a schematic right side view of a funnel of the multifunctional phase-contrast microscopic device of an embodiment in the present invention.
Figure 5E:
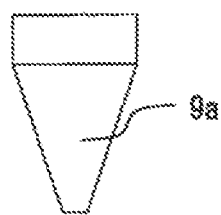
FIG. 5(e) is a schematic left side view of a funnel of the multifunctional phase-contrast microscopic device of an embodiment in the present invention.

FIG. 5(a) is a schematic back view of the funnel 9 of the multifunctional phase-contrast microscopic device MR of an embodiment in the present invention. FIG. 5(b) is a schematic front view of the funnel 9 of the multifunctional phase-contrast microscopic device MR of an embodiment in the present invention. FIG. 5(c) is a schematic plan view of the funnel 9 of the multifunctional phase-contrast microscopic device MR of an embodiment in the present invention. FIG. 5(d) is a schematic right-side view of the funnel 9 of the multifunctional phase-contrast microscopic device MR of an embodiment in the present invention. FIG. 5(e) is a schematic left side view of the funnel 9 of the multifunctional phase-contrast microscopic device MR of an embodiment in the present invention.

Figure 6:
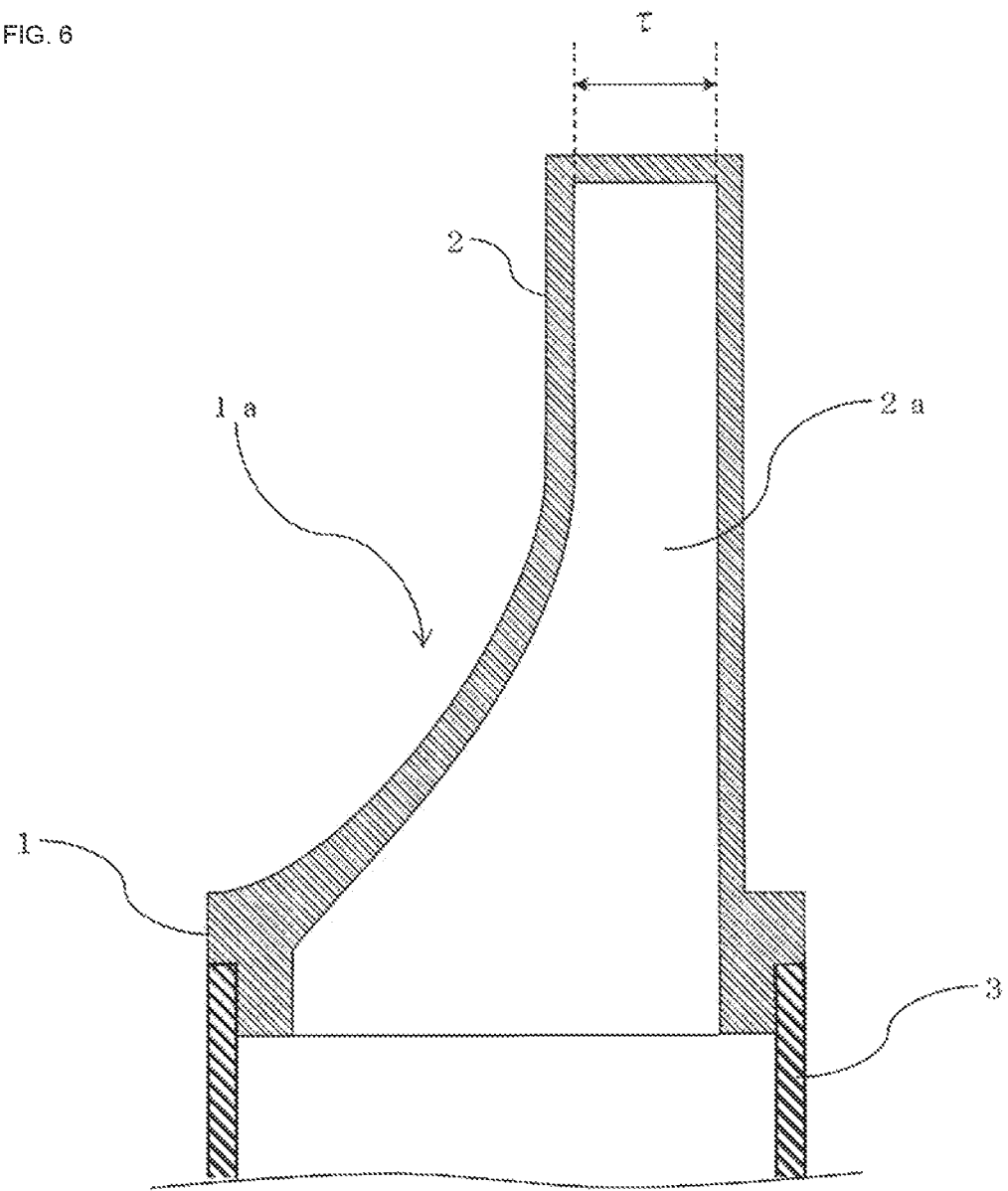
FIG. 6 is a schematic enlarged partial cross-sectional arrow view of near the specimen container lid of the multifunctional phase-contrast microscopic device of an embodiment in the present invention

FIG. 6 is a schematic enlarged partial cross-sectional arrow view of near the specimen container lid 1 of the multifunctional phase-contrast microscopic device MR of an embodiment in the present invention as viewed from the arrow X-X (see FIG. 4(a)).

The hollow part 2a is a thin hollow part of 0.7 to 1.5 mm in thickness T, although magnified in FIG. 6.

The components in the drawings are shown in consideration of the diversity of embodiments, and this applies to the components described below. For example, some components may not be shown in the diagram, or may be transparently or abbreviated, so that the essential structure is more comprehensible.

This embodiment is related to the multifunctional phase-contrast microscopic device MR that allows observation of cells, etc. in the storage container part 1a without removing the observation cell 2, and the funnel 9 for tissue segregation associated with the multifunctional phase-contrast microscopic device MR.

Sampling errors are unlikely to occur because the solid tissue of the collected specimen is identified from the microscopic cells and the phase-contrast microscopic observation of the cell is realized in the specimen container part 1a, which is also used as a test-tube type transport vial.

After the tissue has been sorted from the cells in the identification area 10 of the funnel 9, the phase-contrast microscopic observation of the liquid specimen is performed with the specimen container part 1a. A multifunctional phase-contrast microscopic device MR with an imaging camera with autofocus function on a smartphone 15, a phase-contrast objective lens 6, an LED light source 13, and a holder 4 for the specimen container part 1a is provided, so that specimen adequacy can be easily checked immediately after sampling.

More specifically, the multifunctional phase-contrast microscopic device MR is described as follows.

The specimen container part 1a is a part having an observation cell 2, which stores the collected specimen and allows observation of the cells contained in the collected specimen.

Phase-contrast objective lens 6 is a lens positioned in a position that can correspond to observation cell 2.

The smartphone mounting fixture 14 is a mounting section on which a smartphone 15 having an imaging function can be mounted.

In addition, an embodiment of a modified example can also be considered in which a mechanism is provided for adjusting the position of the smartphone 15 so that the position of the camera lens of the smartphone 15 matches the position of the aperture 17 of the multifunctional phase-contrast microscopic device MR corresponding to the phase-contrast objective lens 6.

The holder 4 is a mounting section on which the specimen container part 1a is mounted in an inverted position.

The funnel 9 is a funnel having an identification area 10 for sorting the tissue contained in the collected specimen from the cells.

Although the funnel 9 is an assembled paper product used as a sanitary disposable product, an embodiment of a modified example in which the funnel 9 is a molded press product made of stainless steel can also be considered.

In addition, although the identification area 10 is flat, an embodiment of a modified example in which the identification area 10 is uneven and slightly inclined to prevent the tissue contained in the collected specimen from falling into the specimen container body 3, can also be considered.

Observation of cells through a phase-contrast objective lens 6 is carried out using a smartphone 15 mounted on smartphone mounting fixture 14.

The specimen container part 1a has a specimen container body 3 for storing the collected specimen, and a specimen container lid 1 detachable from the specimen container body 3, in which an observation cell 2 is provided.

Although the specimen container lid 1 is a molded press-formed product made of resin, which at least the observation cell is transparent, an embodiment of a modified example in which the specimen container lid 1 is a blow-molded glass product, can also be considered.

The specimen container part 1a can be detachable from the holder 4. By placing the specimen container part 1a on the holder 4 in an inverted position, cells contained in the specimen container body 3 are guided to the observation cell 2.

In addition, the specimen container part 1a, which is detachable from the holder 4, is inverted by the fingers of the specimen collector or the like and inserted into the specimen container part insertion port 8, but an embodiment of a modified example in which the specimen container part 1a is rotatably fixed to the multifunctional phase-contrast microscopic device MR and a mechanism for inverting the specimen container part 1a by automatic or semi-automatic rotation can also be considered.

An embodiment of a modified example in which the observation cell 2 is provided at the bottom of the specimen container body 3 so that the specimen container part 1a does not need to be inverted, can also be considered.

After the tissue has been sorted using the identification area 10, the residue of the specimen can fall into the specimen container body 3.

The funnel 9 has a pool 11 for storing liquid for flushing the residue to the specimen container body 3.

Incidentally, although two windows MRa are provided on the back surface of the multifunctional phase-contrast microscopic device MR for checking the residue falling through the central washout hole possessed by the funnel body section 9a of the funnel 9 *m* microscopic device mounted on the funnel mounting section 9b of the multifunctional phase-contrast microscopic device MR, an embodiment of a modified example without the windows MRa can also be considered.

The multifunctional phase-contrast microscopic device MR is an example of the microscopic device of the present invention.

The specimen container part 1a is an example of a specimen container part of the present invention, the specimen container body 3 is an example of a specimen container body of the present invention, the specimen container lid 1 is an example of a specimen container lid of the present invention, and the observation cell 2 is an example of an observation area of the present invention.

A phase-contrast objective lens 6 is an example of the objective lens of the present invention.

The holder 4 is an example of a specimen container part mounting section of the present invention.

The smartphone mounting fixture 14 is an example of a portable device mounting section of the present invention.

The smartphone 15 is an example of a portable device of the present invention.

The funnel 9 is an example of the funnel of the present invention, the identification area 10 is an example of the identification area of the present invention, and the pool 11 is an example of the pool of the present invention.

The main causes of improper specimens are dry degeneration before fixation, contamination with large amounts of blood, and too few cells. Dry degeneration prior to fixation and contamination with large amounts of blood are reduced by collecting the cells in a container containing a cell preservation solution containing a hemolytic agent. Even if the cells remain in the syringe and sufficient cells cannot be obtained by puncture aspiration with a syringe, the syringe is thoroughly flushed with the preservation solution before the preservation solution is discharged. This increases the cell recovery rate.

In recent years, an increasing number of facilities are using or considering a technique called liquid-based cytology (LBC) for puncture materials. The LBC method is a method for cytological examination that was developed to prevent cell degeneration by collecting specimens in a preservation solution composed mainly of alcohol and other substances to increase the efficiency of cell recovery.

Then, a specimen collector such as a doctor can use the multifunctional phase-contrast microscopic device MR in place of the regular biological microscope in the specimen collection site and evaluate the specimen adequacy by themselves.

The multifunctional phase-contrast microscopic device MR will be described more specifically as follows.

The collected sample is first discharged from the collection instrument into the identification area 10 of the funnel 9. The background color of the identification area 10 is blackish in color, so that tissue fragments that appear white in color to the normal naked eye are more vivid and easier to identify. The sampling technician picks the solid tissue from the identification area 10 with tweezers or the like and transfers it to a formalin container or the like. The microscopic residue in the identification area 10 is collected along with the preservation solution in the centrifuge tube type specimen container body 3 in stand 12, which is a test tube stand directly below, as the identification area 10 is washed away using a cell preservation solution such as alcohol.

The specimen container lid 1 is attached to the specimen container body 3, and the specimen container part 1a is inverted and inserted into the holder 4. The liquid specimen is thinly layered in the transparent, colorless observation cell 2, and the LED light source 13 and the phase-contrast objective lens 6 are used to image the cells on the monitor of the smartphone 15 as a cell image with an enhanced contrast of light and dark. Thus, the cells can be observed even without staining.

The black background body 7 of the holder 4 for observation cell 2 effectively intensifies the light/dark ratio of the image, making structures such as unstained cells clearer.

Since the camera of the smartphone 15 has an autofocus function, the multifunctional phase-contrast microscopic device MR does not require a manual focusing action as in a regular microscopic device. After imaging and saving the images, the cells can be observed in greater detail because the images can be magnified at will by operating the LCD monitor screen of the smartphone 15 with fingers.

In order to enhance convenience, the lower front part of the multifunctional phase-contrast microscopic device MR is provided with a storage section 16, which can store the specimen container lid 1 and the funnel 9, etc. The storage section 16 has a mounting section for the LED light source 13, and by pulling out the storage section 16, the batteries of the LED light source 13 can be replaced.

Thus, the multifunctional phase-contrast microscopic device MR with a specimen container lid 1, a phase-contrast objective lens 6 and an LED light source 13, enables proper evaluation without staining by capturing digital images of the cells by using the autofocus function of the smartphone 15 camera.

An observation cell 2 having a thin hollow section 2a is provided at the upper end of the specimen container lid 1 so that it is connected to the specimen container body 3. By inverting the specimen container part 1a, the cells are moved and settled inside the observation cell 2 with the preservation solution. The inner surface of the observation cell 2 is formed as a gently curved surface so that a large number of cells move into the observable area of the interior of the observation cell 2 with the preservation solution. The transparent, colorless observation cell 2 serves as a slide glass and a cover glass to facilitate the focusing motion, and allows for cell observation at high magnification of the phase-contrast microscopic lens.

Since the observation cell 2 is inserted into the observation cell insertion port 5 along the longitudinal direction of the observation cell, the function of securing the inverted specimen container part 1a is realized. However, the observation cell 2 inserted into the observation cell insertion slot 5 can be moved in the left and right directions while the distance between the observation cell 2 and the objective lens is kept constant, thereby expanding the observation field of view of the observation cell 2. In addition, a clear contrast is obtained by the black background body 7 of the holder 4, which is a component of the multifunctional phase-contrast microscopic device MR.

For this reason, with respect to the width of the observation cell 2, w1 (see FIG. 4(*a*)), which corresponds to the width of the specimen container lid 1, the width of the observation cell insertion port 5, w2 (see FIG. 3(*c*)), which corresponds to the width of the holder 4, and the width of the black background body 7, w3 (see FIG. 3(*b*)), the relationship w3>w2>w1 should be established.

The funnel 9 has an identification area 10 for sorting solid tissue from microscopic cells, and after the tissue is removed with tweezers, the interior of the funnel 9 is washed away with cell preservation solution. The microscopic residue flows as a liquid specimen through the funnel 9 into the specimen container part 3 directly below. The funnel 9 also has a pool 11 of preservation solution for collecting the residue in the syringe, and a useful sampling action is achieved as a series of steps.

In order to visually check the specimen in the state of the specimen container part 1a at a level of microscopic magnification, an observation cell 2 provided in the specimen container lid 1 of the specimen container body 3 is used. The imaging is performed by a phase-contrast objective lens 6 and a camera of the smartphone 15 with an autofocus function.

And, the solid tissue removed by using the funnel 9 with the identification area 10 is then transferred to a purpose-specific preservation solution (e.g., formalin), and the residue remaining in the funnel is poured into the body of the centrifugal tube specimen container 3, which is located downward, using other preservation solutions (e.g., alcohol). These operations make it possible to easily sort solid tissue (e.g., tissue for pathology) from microscopic cells (e.g., cells for cytology), which not only can increase the cell collect rate, but drying degeneration before fixation also can be prevented. By using a preservation solution containing a hemolytic agent, improper specimens due to large amounts of blood contamination are unlikely to occur.

Since the specimen container lid 1 is used, the specimen in the cell preservation solution, which is thinly layered within the observation cell 2, can eventually be observable at a high magnification of approximately 200× with a camera of the smartphone 15 and the multifunctional phase-contrast microscopic device MR. Appropriate evaluation of the specimens at the specimen collection site is realized, and not only is the specimen transported to the testing facility in a sealed state, but the specimen container part 1a can also be used as a storage container, which enhances convenience.

Such liquid specimen in the preservation solution can later be used for additional tests, such as immunostaining, special staining, or virus testing, which will enhance diagnostic accuracy and promote the widespread use of liquid specimen methods using the multifunctional phase-contrast microscopic device MR.

Real-time specimen assessment by specimen collectors, such as physicians, is realized, and the multifunctional phase-contrast microscopic device MR, can result in enhanced collection techniques and other aspects.

The multifunctional phase-contrast microscopy device MR contributes to earlier diagnosis and initiation of treatment, as inappropriate specimens are less likely to be generated, thus improving examination accuracy.

By using the multifunctional phase-contrast microscopic device MR with the observation cell 2, microscopic level observation is realized in the state of the specimen container part 1a, which can also be used as a transport vial, and not only cells of the human body, but also microscopic organisms such as daphnia or plankton can be observed. Therefore, it is also expected to have a wide range of applications in medical, biological and oceanographic research and education, as well as in related industries.

And with the future development of smartphone applications and imaging devices, various possibilities are expected to have a positive impact on the imaging by the above-mentioned multifunctional phase-contrast microscopic device MR.

INDUSTRIAL APPLICABILITY

The microscopic device in the present invention enables easy observation of a collected specimen, and is useful, for example, for the purpose of using the microscopic device for proper evaluation of the specimen.

REFERENCE SIGNS LIST

MR Multifunctional phase-contrast microscopic device
MRa Window
1a Specimen container part
1 Specimen container lid
2 Observation cell
2a Hollow section
3 Specimen container body
4 Holder
5 Observation cell insertion port
6a Phase-contrast objective lens
7 Black background body
8 Specimen container part insertion port
9 Funnel
9a Funnel body section
9b Funnel placement section
10 Identification area
11 Pool
12 Stand
13 LED light source
14 Smartphone mounting fixture
15 Smartphone
16 Storage section
17 Aperture

What is claimed is:

1. A microscopic device comprising:
a specimen container part storing a collected specimen and having an observation area in which cells contained in the collected specimen can be observed;
an objective lens aligned at a position corresponding to-the observation area; and
a portable device mounting section on which a portable device having an imaging function can be mounted,
wherein the observation of the cells by the objective lens is performed by using the portable device mounted on the portable device mounting section, and
wherein the specimen container part has a specimen container body for storing the collected specimen, and a specimen container lid provided with the observation area, detachable from the specimen container body; and
further comprising a specimen container part mounting section on which the specimen container part is inverted and mounted,
wherein the specimen container part is detachable from the specimen container part mounting section, and
wherein the specimen container part is inverted and mounted on the specimen container part mounting section so that cells contained in specimen stored in the specimen container body are guided to the observation area.

2. A microscopic device comprising:
a specimen container part storing a collected specimen and having an observation area in which cells contained in the collected specimen can be observed;
an objective lens aligned at a position corresponding to-the observation area; and
a portable device mounting section on which a portable device having an imaging function can be mounted,
wherein the observation of the cells by the objective lens is performed by using the portable device mounted on the portable device mounting section, and
wherein the specimen container part has a specimen container body for storing the collected specimen, and a specimen container lid provided with the observation area, detachable from the specimen container body; and further comprising a funnel having an identification area for sorting a tissue contained in the collected specimen from the cells, wherein after the tissue is sorted by using the identification area, the residue of the specimen can be dropped into the specimen container body.

3. The microscopic device according to claim 2, wherein the funnel has a pool for storing a liquid for flushing the-residue into the specimen container body.

4. The microscopic device as according to claim 1, comprising a funnel having an identification area for sorting a tissue contained in the collected specimen from the cells, wherein after the tissue is sorted by using the identification area, the residue of the specimen can be dropped into the specimen container body.

5. The microscopic device according to claim 4, wherein the funnel has a pool for storing a liquid for flushing the-residue into the specimen container body.

\* \* \* \* \*